(12) United States Patent
Grabarnik et al.

(10) Patent No.: US 12,372,799 B2
(45) Date of Patent: Jul. 29, 2025

(54) ROTATABLE LIGHTPIPE (71) Applicant: Lumus Ltd., Ness Ziona (IL)

(72) Inventors: Shimon Grabarnik, Rehovot (IL); Tsion Eisenfeld, Ashkelon (IL)

(73) Assignee: LUMUS LTD., Ness Ziona (IL)

(*) Notice: Subject to any disclaimer, the term of this patent is extended or adjusted under 35 U.S.C. 154(b) by 553 days.

(21) Appl. No.: 17/792,452

(22) PCT Filed: May 3, 2021

(86) PCT No.: PCT/IL2021/050503
§ 371 (c)(1),
(2) Date: Jul. 13, 2022

(87) PCT Pub. No.: WO2021/229563
PCT Pub. Date: Nov. 18, 2021

(65) Prior Publication Data
US 2022/0390754 A1 Dec. 8, 2022

Related U.S. Application Data

(60) Provisional application No. 63/023,272, filed on May 12, 2020.

(51) Int. Cl.
*G02B 27/09* (2006.01)
*G02B 3/08* (2006.01)
*G02B 27/01* (2006.01)

(52) U.S. Cl.
CPC ........... *G02B 27/0994* (2013.01); *G02B 3/08* (2013.01); *G02B 27/0172* (2013.01)

(58) Field of Classification Search
CPC ............ G02B 27/0916; G02B 27/0994; G02B 27/0101; G02B 27/0172; G02B 27/0174;
(Continued)

(56) References Cited

U.S. PATENT DOCUMENTS 3,626,394 A 12/1971 Nelson et al.
3,829,197 A 8/1974 Thelen
(Continued)

FOREIGN PATENT DOCUMENTS

CN 200941530 Y 9/2007
CN 101542346 9/2009
(Continued)

OTHER PUBLICATIONS

Lynch et al. "Beam Manipulation: Prisms vs. Mirrors",Photonik International pp. 45-47. Mar. 2009. Available since Sep. 20, 2016 at the following URL: <http://www.edmundoptics.com/globalassets/resources/articles/beammanipulation-prisms-vs-mirrors-en.pdf> Lynch et al. Mar. 31, 2009 (Mar. 31, 2009).
(Continued)

Primary Examiner — Sultan Chowdhury
(74) Attorney, Agent, or Firm — Rivka Friedman (57) ABSTRACT

Based on a rotational axis of symmetry for an output of a lightpipe coinciding with an input axis for projection optics, the lightpipe can be rotated around the rotational axis, in order to align the lightpipe with a frame of associated glasses, or correspondingly the temple of a wearer of the glasses. Thus, an improved or optimal aesthetic look of a display system can be approached. The lightpipe of the display system can be aligned with the frame of the glasses, or even hidden within the frame, depending on implementation details and requirements for image projection components. If a pantoscopic tilt of the lens (waveguide) changes, a rotation of the lightpipe can be applied to the lightpipe to bring the lightpipe in a position aligned with the temple again, thus avoiding the need for a lightpipe redesign.

10 Claims, 5 Drawing Sheets

(58) Field of Classification Search
CPC .......... G02B 6/00; G02B 6/001; G02B 6/005;
G02B 6/008; G03B 21/005; G03B
21/006; G03B 21/008; G03B 21/28;
G03B 21/208; G03B 21/2013; G03B
21/2033; G03B 21/2053; H04N 9/315;
H04N 9/3102; H04N 9/3108; H04N
9/3141; H04N 9/3152; H04N 9/3155
See application file for complete search history.

(56) References Cited

U.S. PATENT DOCUMENTS

| | | |
|---|---|---|
| 3,873,209 A | 3/1975 | Schinke et al. |
| 3,969,023 A | 7/1976 | Brandt et al. |
| 4,355,864 A | 10/1982 | Soref |
| 4,662,717 A | 5/1987 | Yamada et al. |
| 4,720,189 A | 1/1988 | Heynen et al. |
| 5,096,520 A | 3/1992 | Faris |
| 5,208,800 A | 5/1993 | Isobe et al. |
| 5,235,589 A | 8/1993 | Yokomori et al. |
| 5,398,171 A | 3/1995 | Davenport et al. |
| 5,555,329 A | 9/1996 | Kuper et al. |
| 5,712,694 A | 1/1998 | Taira et al. |
| 5,745,199 A | 4/1998 | Suzuki et al. |
| 5,852,693 A | 12/1998 | Jeong |
| 5,905,837 A | 5/1999 | Wang et al. |
| 6,021,239 A | 2/2000 | Minami et al. |
| 6,137,461 A | 10/2000 | Deter et al. |
| 6,222,676 B1 | 4/2001 | Togino et al. |
| 6,231,992 B1 | 5/2001 | Niebauer et al. |
| 6,239,092 B1 | 5/2001 | Papasso et al. |
| 6,264,328 B1 | 7/2001 | Williams |
| 6,322,256 B1 | 11/2001 | Inada et al. |
| 6,324,330 B1 | 11/2001 | Stites |
| 6,349,001 B1 | 2/2002 | Spitzer |
| 6,362,861 B1 | 3/2002 | Hertz et al. |
| 6,384,982 B1 | 5/2002 | Spitzer |
| 6,388,814 B2 | 5/2002 | Tanaka |
| 6,394,607 B1 | 5/2002 | Hashizume et al. |
| 6,404,550 B1 | 6/2002 | Yajima |
| 6,404,947 B1 | 6/2002 | Matsuda |
| 6,483,113 B1 | 11/2002 | Sealy et al. |
| 6,490,104 B1 | 12/2002 | Gleckman et al. |
| 6,509,982 B2 | 1/2003 | Steiner |
| 6,542,307 B2 | 4/2003 | Gleckman |
| 6,556,282 B2 | 4/2003 | Jamieson et al. |
| 6,577,411 B1 | 6/2003 | David |
| 6,671,100 B1 | 12/2003 | McRuer |
| 6,690,513 B2 | 2/2004 | Hulse et al. |
| 6,710,902 B2 | 3/2004 | Takeyama |
| 6,775,432 B2 | 8/2004 | Basu |
| 6,791,760 B2 | 9/2004 | Janeczko et al. |
| 6,798,579 B2 | 9/2004 | Robinson et al. |
| 6,829,095 B2 | 12/2004 | Amitai |
| 6,880,931 B2 | 4/2005 | Moliton et al. |
| 6,927,694 B1 | 9/2005 | Smith et al. |
| 6,942,925 B1 | 9/2005 | Lazarev et al. |
| 7,016,113 B2 | 3/2006 | Choi et al. |
| 7,021,777 B2 | 4/2006 | Amitai |
| 7,088,664 B2 | 8/2006 | Kim et al. |
| 7,148,936 B1 | 12/2006 | Hirota et al. |
| 7,175,304 B2 | 2/2007 | Wadia et al. |
| 7,205,960 B2 | 4/2007 | David |
| 7,344,256 B2 * | 3/2008 | Watanabe ............... H04N 9/315 |
| | | 348/E5.142 |
| 7,355,795 B1 | 4/2008 | Yamazaki et al. |
| 7,384,159 B2 | 6/2008 | Takeda |
| 7,391,573 B2 | 6/2008 | Amitai |
| 7,418,170 B2 | 8/2008 | Mukawa et al. |
| 7,430,355 B2 | 9/2008 | Heikenfeld et al. |
| 7,448,170 B2 | 11/2008 | Milovan et al. |
| 7,457,040 B2 | 11/2008 | Amitai |
| 7,577,326 B2 | 8/2009 | Amitai |
| 7,612,879 B2 | 11/2009 | Stumpe et al. |
| 7,643,214 B2 | 1/2010 | Amitai |
| 7,672,055 B2 | 3/2010 | Amitai |
| 7,724,443 B2 | 5/2010 | Amitai |
| 7,778,508 B2 | 8/2010 | Hirayama |
| 7,808,625 B2 | 10/2010 | Nakamura et al. |
| 7,949,214 B2 | 5/2011 | Dejong |
| 7,995,275 B2 | 8/2011 | Maeda et al. |
| 8,000,020 B2 | 8/2011 | Amitai |
| 8,035,872 B2 | 10/2011 | Ouchi |
| 8,098,439 B2 | 1/2012 | Amitai et al. |
| 8,187,481 B1 | 5/2012 | Hobbs |
| 8,369,019 B2 | 2/2013 | Baker |
| 8,405,573 B2 | 3/2013 | Lapidot et al. |
| 8,432,614 B2 | 4/2013 | Amitai |
| 8,472,119 B1 | 6/2013 | Kelly |
| 8,643,948 B2 | 2/2014 | Amitai et al. |
| 8,655,178 B2 | 2/2014 | Capron et al. |
| 8,665,178 B1 | 3/2014 | Wang |
| 8,666,208 B1 | 3/2014 | Amirparviz et al. |
| 8,718,437 B2 | 5/2014 | Coe-Sullivan |
| 8,736,963 B2 | 5/2014 | Robbins et al. |
| 8,743,464 B1 | 6/2014 | Amirparviz |
| 8,913,865 B1 | 12/2014 | Bennett |
| 8,965,152 B2 | 2/2015 | Simmonds |
| 9,025,253 B2 | 5/2015 | Hadad et al. |
| 9,395,690 B2 | 7/2016 | Futterer |
| 9,523,852 B1 | 12/2016 | Brown et al. |
| 9,541,762 B2 | 1/2017 | Mukawa et al. |
| 9,551,880 B2 | 1/2017 | Amitai |
| 9,709,809 B2 | 7/2017 | Miyawaki et al. |
| 9,798,061 B2 | 10/2017 | Hsiao et al. |
| 9,805,633 B2 | 10/2017 | Zheng |
| 9,933,684 B2 | 4/2018 | Brown et al. |
| 10,007,046 B2 | 6/2018 | Chung et al. |
| 10,222,535 B2 | 3/2019 | Remhof et al. |
| 10,302,957 B2 | 5/2019 | Sissom |
| 10,330,937 B2 | 6/2019 | Cheng et al. |
| 10,466,479 B2 | 11/2019 | Shih et al. |
| 10,859,845 B2 | 12/2020 | Kyosuna et al. |
| 10,908,426 B2 | 2/2021 | Amitai |
| 10,951,867 B2 | 3/2021 | Pappas et al. |
| 11,243,434 B2 | 2/2022 | Sharlin et al. |
| 2001/0000124 A1 | 4/2001 | Kolin et al. |
| 2001/0030860 A1 | 10/2001 | Kimura et al. |
| 2002/0075454 A1 | 6/2002 | Hsiung |
| 2002/0097762 A1 | 7/2002 | Yoshimura et al. |
| 2002/0176173 A1 | 11/2002 | Song |
| 2003/0072160 A1 | 4/2003 | Kuepper et al. |
| 2003/0165017 A1 | 9/2003 | Amitai |
| 2003/0169504 A1 | 9/2003 | Kaminsky et al. |
| 2003/0235768 A1 | 12/2003 | Fincher et al. |
| 2004/0032660 A1 | 2/2004 | Amitai |
| 2004/0033528 A1 | 2/2004 | Amitai |
| 2004/0095860 A1 | 5/2004 | Ariyoshi et al. |
| 2004/0013068 A1 | 7/2004 | Aastuen et al. |
| 2005/0012842 A1 | 1/2005 | Miyagawa et al. |
| 2005/0024849 A1 | 2/2005 | Parker et al. |
| 2005/0078388 A1 | 4/2005 | Amitai |
| 2005/0083592 A1 | 4/2005 | Amitai |
| 2005/0017465 A1 | 8/2005 | Long et al. |
| 2005/0174658 A1 | 8/2005 | Long et al. |
| 2005/0180687 A1 | 8/2005 | Amitai |
| 2006/0092389 A1 * | 5/2006 | Wang ................ G02B 27/0994 |
| | | 353/99 |
| 2006/0171046 A1 | 8/2006 | Recco et al. |
| 2006/0268421 A1 | 11/2006 | Shimizu et al. |
| 2007/0000219 A1 | 1/2007 | Hashizume et al. |
| 2007/0002191 A1 | 1/2007 | Hashizume et al. |
| 2007/0035707 A1 | 2/2007 | Margulis |
| 2007/0070859 A1 | 3/2007 | Hirayama |
| 2007/0091445 A1 | 4/2007 | Amitai |
| 2007/0097513 A1 | 5/2007 | Amitai |
| 2007/0155277 A1 | 7/2007 | Amitai |
| 2007/0159673 A1 | 7/2007 | Freeman et al. |
| 2007/0165192 A1 | 7/2007 | Prior |
| 2007/0188837 A1 | 8/2007 | Shimizu et al. |
| 2008/0025667 A1 | 1/2008 | Amitai |
| 2008/0106775 A1 | 5/2008 | Amitai et al. |
| 2008/0151375 A1 | 6/2008 | Lin |
| 2008/0151379 A1 | 6/2008 | Amitai |

(56) References Cited

U.S. PATENT DOCUMENTS

| | | |
|---|---|---|
| 2008/0186604 A1 | 8/2008 | Amitai |
| 2008/0192239 A1 | 8/2008 | Otosaka |
| 2008/0198471 A1 | 8/2008 | Amitai |
| 2008/0247150 A1 | 10/2008 | Itoh et al. |
| 2008/0259429 A1 | 10/2008 | Kamm et al. |
| 2008/0278812 A1 | 11/2008 | Amitai |
| 2008/0285140 A1 | 11/2008 | Amitai |
| 2008/0304150 A1 | 12/2008 | Yamauchi |
| 2009/0010023 A1 | 1/2009 | Kanade et al. |
| 2009/0052046 A1 | 2/2009 | Amitai |
| 2009/0052047 A1 | 2/2009 | Amitai |
| 2009/0097127 A1 | 4/2009 | Amitai |
| 2009/0122414 A1 | 5/2009 | Amitai |
| 2009/0128781 A1* | 5/2009 | Li .................. G02B 27/0994 362/555 |
| 2009/0153437 A1 | 6/2009 | Aharoni |
| 2009/0323482 A1 | 12/2009 | Nakanuma |
| 2010/0027289 A1 | 2/2010 | Aiki et al. |
| 2010/0033784 A1 | 2/2010 | Renaud-Goud |
| 2010/0053148 A1 | 3/2010 | Khazeni et al. |
| 2010/0171680 A1 | 7/2010 | Lapidot et al. |
| 2010/0201128 A1 | 8/2010 | Saccomammo |
| 2010/0202048 A1* | 8/2010 | Amitai .................. G02B 27/28 359/485.02 |
| 2010/0202128 A1 | 8/2010 | Saccomanno |
| 2010/0214635 A1 | 8/2010 | Sasaki et al. |
| 2010/0291489 A1 | 11/2010 | Moskovits et al. |
| 2011/0096566 A1 | 4/2011 | Tsai et al. |
| 2011/0176218 A1 | 7/2011 | Noui |
| 2011/0227661 A1 | 9/2011 | Numata et al. |
| 2011/0242661 A1 | 10/2011 | Simmonds |
| 2012/0002256 A1 | 1/2012 | Lacoste et al. |
| 2012/0062998 A1 | 3/2012 | Schultz et al. |
| 2012/0068609 A1 | 3/2012 | Ide et al. |
| 2012/0154920 A1 | 6/2012 | Harrison et al. |
| 2012/0179369 A1 | 6/2012 | Lapidot et al. |
| 2012/0194781 A1 | 8/2012 | Agurok |
| 2012/0274751 A1 | 11/2012 | Smith et al. |
| 2012/0306940 A1 | 12/2012 | Machida |
| 2012/0320100 A1 | 12/2012 | Machida et al. |
| 2013/0016292 A1 | 1/2013 | Mlao et al. |
| 2013/0021581 A1 | 1/2013 | Takahashi et al. |
| 2013/0022316 A1 | 1/2013 | Pelletier et al. |
| 2013/0027655 A1 | 1/2013 | Blum et al. |
| 2013/0135749 A1 | 5/2013 | Akutsu et al. |
| 2013/0229717 A1 | 9/2013 | Amitai |
| 2013/0250430 A1 | 9/2013 | Robbins et al. |
| 2013/0276960 A1 | 10/2013 | Amitai |
| 2013/0279017 A1 | 10/2013 | Amitai |
| 2013/0335708 A1 | 12/2013 | Ouderkirk |
| 2014/0118813 A1 | 5/2014 | Amitai et al. |
| 2014/0118836 A1 | 5/2014 | Amitai et al. |
| 2014/0118837 A1 | 5/2014 | Amitai et al. |
| 2014/0126051 A1 | 5/2014 | Amitai et al. |
| 2014/0126052 A1 | 5/2014 | Amitai et al. |
| 2014/0126056 A1 | 5/2014 | Amitai et al. |
| 2014/0126057 A1 | 5/2014 | Amitai et al. |
| 2014/0126175 A1 | 5/2014 | Amitai et al. |
| 2014/0160577 A1 | 6/2014 | Dominici et al. |
| 2014/0226361 A1 | 8/2014 | Vasylyev |
| 2014/0240834 A1 | 8/2014 | Mason |
| 2014/0334777 A1 | 11/2014 | Dubroca et al. |
| 2015/0013105 A1 | 1/2015 | Kuan |
| 2015/0131059 A1 | 5/2015 | Fischer et al. |
| 2015/0138451 A1 | 5/2015 | Amitai |
| 2015/0153569 A1 | 6/2015 | Yonekubo |
| 2015/0182348 A1 | 7/2015 | Siegal et al. |
| 2015/0198805 A1 | 7/2015 | Mansharof et al. |
| 2015/0205140 A1 | 7/2015 | Mansharof et al. |
| 2015/0205141 A1 | 7/2015 | Mansharof et al. |
| 2015/0241619 A1 | 8/2015 | Richards et al. |
| 2015/0277127 A1 | 10/2015 | Amitai |
| 2015/0288937 A1 | 10/2015 | Tsai et al. |
| 2015/0309312 A1 | 10/2015 | Ackerman |
| 2015/0331546 A1 | 11/2015 | Craven-Bartle et al. |
| 2015/0293360 A1 | 12/2015 | Amitai |
| 2016/0062119 A1 | 3/2016 | Fitch et al. |
| 2016/0116743 A1 | 4/2016 | Amitai |
| 2016/0116744 A1 | 4/2016 | Taleda et al. |
| 2016/0170212 A1 | 6/2016 | Amitai |
| 2016/0170213 A1 | 6/2016 | Amitai |
| 2016/0170214 A1 | 6/2016 | Amitai |
| 2016/0187656 A1 | 6/2016 | Amitai |
| 2016/0202048 A1 | 7/2016 | Meng |
| 2016/0238844 A1 | 8/2016 | Dobschal |
| 2016/0313567 A1 | 10/2016 | Kurashige |
| 2016/0314564 A1 | 10/2016 | Jones |
| 2016/0334625 A1 | 11/2016 | Iba et al. |
| 2016/0341964 A1 | 11/2016 | Amitai |
| 2016/0349518 A1 | 12/2016 | Amitai et al. |
| 2016/0370693 A1 | 12/2016 | Watanabe |
| 2017/0003504 A1 | 1/2017 | Vallius et al. |
| 2017/0004574 A1 | 1/2017 | Deats et al. |
| 2017/0045664 A1 | 2/2017 | Chung |
| 2017/0045743 A1 | 2/2017 | Dobschal et al. |
| 2017/0045744 A1 | 2/2017 | Amitai |
| 2017/0052376 A1 | 2/2017 | Amitai |
| 2017/0052377 A1 | 2/2017 | Amitai |
| 2017/0090094 A1 | 3/2017 | Ohsugi et al. |
| 2017/0097506 A1 | 4/2017 | Schowengerdt et al. |
| 2017/0122725 A1 | 5/2017 | Yeoh |
| 2017/0242249 A1 | 8/2017 | Wall et al. |
| 2017/0276947 A1 | 9/2017 | Yokoyama |
| 2017/0336636 A1 | 11/2017 | Amitai et al. |
| 2017/0357095 A1 | 12/2017 | Amitai |
| 2017/0357100 A1 | 12/2017 | Ouderkirk et al. |
| 2017/0363799 A1 | 12/2017 | Ofir et al. |
| 2018/0021020 A1 | 1/2018 | Lefevre et al. |
| 2018/0039082 A1 | 2/2018 | Amitai |
| 2018/0067315 A1 | 3/2018 | Amitai et al. |
| 2018/0120768 A1 | 5/2018 | Christmas |
| 2018/0129166 A1 | 5/2018 | Seo et al. |
| 2018/0157057 A1 | 6/2018 | Gelberg et al. |
| 2018/0188532 A1 | 7/2018 | Christmas |
| 2018/0210202 A1 | 7/2018 | Danziger |
| 2018/0262725 A1 | 9/2018 | Fan |
| 2018/0267295 A1 | 9/2018 | Dalrymple et al. |
| 2018/0267317 A1 | 9/2018 | Amitai |
| 2018/0275384 A1 | 9/2018 | Danziger et al. |
| 2018/0284440 A1 | 10/2018 | Popovich et al. |
| 2018/0292592 A1 | 10/2018 | Danziger |
| 2018/0292599 A1 | 10/2018 | Ofir et al. |
| 2018/0322845 A1 | 11/2018 | Machida |
| 2018/0335629 A1 | 11/2018 | Cheng et al. |
| 2018/0373039 A1 | 12/2018 | Amitai |
| 2019/0011710 A1 | 1/2019 | Amitai |
| 2019/0018245 A1 | 1/2019 | Cheng et al. |
| 2019/0020858 A1 | 1/2019 | Pappas et al. |
| 2019/0022731 A1 | 1/2019 | Yabuoshi |
| 2019/0056600 A1 | 2/2019 | Danziger |
| 2019/0064518 A1 | 2/2019 | Danziger |
| 2019/0155035 A1 | 5/2019 | Amitai |
| 2019/0170327 A1 | 6/2019 | Eisenfeld et al. |
| 2019/0187482 A1 | 6/2019 | Lanman |
| 2019/0196199 A1 | 6/2019 | Matsuki et al. |
| 2019/0208187 A1 | 7/2019 | Danziger |
| 2019/0212487 A1 | 7/2019 | Danziger et al. |
| 2019/0227215 A1 | 7/2019 | Danziger et al. |
| 2019/0227317 A1 | 7/2019 | Trail et al. |
| 2019/0278086 A1 | 9/2019 | Ofir |
| 2019/0285900 A1 | 9/2019 | Amitai |
| 2019/0293856 A1 | 9/2019 | Danziger |
| 2019/0339530 A1 | 11/2019 | Amitai |
| 2019/0346609 A1 | 11/2019 | Eisenfeld |
| 2019/0361240 A1 | 11/2019 | Gelberg |
| 2019/0361241 A1 | 11/2019 | Amitai |
| 2019/0377187 A1 | 12/2019 | Rubin et al. |
| 2019/0391408 A1 | 12/2019 | Mansharof et al. |
| 2020/0012086 A1 | 1/2020 | Kawahara |
| 2020/0031053 A1* | 1/2020 | Sheng .................. B29C 64/264 |
| 2020/0033572 A1 | 1/2020 | Danziger et al. |
| 2020/0041713 A1 | 2/2020 | Danziger |
| 2020/0089001 A1 | 3/2020 | Amitai et al. |
| 2020/0110211 A1 | 4/2020 | Danziger et al. |

(56) References Cited

U.S. PATENT DOCUMENTS

| | | |
|---|---|---|
| 2020/0120329 A1 | 4/2020 | Danziger |
| 2020/0133008 A1 | 4/2020 | Amitai |
| 2020/0150330 A1 | 5/2020 | Danziger et al. |
| 2020/0183079 A1 | 6/2020 | Leister |
| 2020/0183159 A1 | 6/2020 | Danziger |
| 2020/0183170 A1 | 6/2020 | Amitai et al. |
| 2020/0200963 A1 | 6/2020 | Eisenfeld et al. |
| 2020/0201059 A1* | 6/2020 | Sheng ............... G02B 27/0977 |
| 2020/0209667 A1 | 7/2020 | Sharlin et al. |
| 2020/0225484 A1 | 7/2020 | Takagi et al. |
| 2020/0241308 A1 | 7/2020 | Danziger et al. |
| 2020/0249481 A1 | 8/2020 | Danziger et al. |
| 2020/0278557 A1 | 9/2020 | Greenstein et al. |
| 2020/0278558 A1 | 9/2020 | Yamamoto et al. |
| 2020/0285060 A1 | 9/2020 | Amitai |
| 2020/0292417 A1 | 9/2020 | Lobachinsky et al. |
| 2020/0292744 A1 | 9/2020 | Danziger |
| 2020/0292819 A1 | 9/2020 | Danziger et al. |
| 2020/0310024 A1 | 10/2020 | Danziger et al. |
| 2020/0326545 A1 | 10/2020 | Amitai et al. |
| 2020/0326655 A1 | 10/2020 | Chang et al. |
| 2020/0371311 A1 | 11/2020 | Lobachinsky et al. |
| 2021/0003849 A1 | 1/2021 | Amitai et al. |
| 2021/0018755 A1 | 1/2021 | Amitai |
| 2021/0033773 A1 | 2/2021 | Danziger et al. |
| 2021/0033862 A1 | 2/2021 | Danziger et al. |
| 2021/0033872 A1 | 2/2021 | Rubin et al. |
| 2021/0055218 A1 | 2/2021 | Aldaag et al. |
| 2021/0055466 A1 | 2/2021 | Eisenfeld |
| 2021/0055561 A1 | 2/2021 | Danziger et al. |
| 2021/0063733 A1 | 3/2021 | Ronen |
| 2021/0072553 A1 | 3/2021 | Danziger et al. |
| 2021/0099691 A1 | 4/2021 | Danziger |
| 2021/0109351 A1 | 4/2021 | Danziger et al. |
| 2021/0116367 A1 | 4/2021 | Gelberg et al. |
| 2021/0141141 A1 | 5/2021 | Danziger et al. |
| 2021/0149199 A1 | 5/2021 | Guan et al. |
| 2021/0157150 A1 | 5/2021 | Amitai |
| 2021/0165231 A1 | 6/2021 | Gelberg et al. |
| 2021/0239898 A1 | 8/2021 | Danziger et al. |
| 2021/0271006 A1 | 9/2021 | Ronen et al. |
| 2022/0003914 A1 | 1/2022 | Danziger et al. |
| 2022/0004001 A1 | 1/2022 | Danziger et al. |
| 2022/0004014 A1 | 1/2022 | Ronen et al. |
| 2022/0019018 A1 | 1/2022 | Gilo et al. |
| 2022/0030205 A1 | 1/2022 | Danziger |
| 2022/0043272 A1 | 2/2022 | Amitai |
| 2022/0057643 A1 | 2/2022 | Eisenfeld et al. |
| 2022/0075194 A1 | 3/2022 | Ronen |
| 2022/0091413 A1 | 3/2022 | Grabarnik et al. |
| 2022/0099885 A1 | 3/2022 | Ronen et al. |
| 2022/0100032 A1 | 3/2022 | Ronen |
| 2022/0128816 A1 | 4/2022 | Danziger et al. |
| 2022/0197037 A1 | 6/2022 | Pennell et al. |
| 2022/0043269 A1 | 10/2022 | Maziel |
| 2022/0317467 A1 | 10/2022 | Danziger |
| 2022/0342216 A1 | 10/2022 | Danziger et al. |
| 2022/0373807 A1 | 11/2022 | Danziger et al. |
| 2023/0019309 A1 | 1/2023 | Chriki et al. |

FOREIGN PATENT DOCUMENTS

| | | |
|---|---|---|
| CN | 101846799 A | 9/2010 |
| CN | 103837988 | 6/2014 |
| CN | 106104569 | 11/2016 |
| CN | 107238928 | 10/2017 |
| CN | 106154569 | 2/2019 |
| CN | 109612384 A | 4/2019 |
| GB | 1514977 | 6/1978 |
| GB | 2153546 A | 8/1985 |
| JP | H04159503 | 6/1992 |
| JP | H08-070782 | 3/1996 |
| JP | H09304036 A | 11/1997 |
| JP | 2001021448 A | 7/1999 |
| JP | 2001021448 | 1/2001 |
| JP | 2003065739 | 3/2003 |
| JP | 2003140081 | 5/2003 |
| JP | 2003149643 | 5/2003 |
| JP | 2012163659 | 5/2003 |
| JP | 2004145330 | 5/2004 |
| JP | 2006145144 | 11/2004 |
| JP | 2006003872 | 1/2006 |
| JP | 2006145644 | 6/2006 |
| JP | 2006201637 | 8/2006 |
| JP | 2008158446 | 12/2006 |
| JP | 2008053517 | 3/2008 |
| JP | 2010014705 | 1/2010 |
| JP | 2010044172 | 2/2010 |
| JP | 2011221235 | 11/2011 |
| JP | 2012058404 | 3/2012 |
| JP | 2012123936 | 6/2012 |
| JP | 2012198263 | 10/2012 |
| JP | 2015099323 | 5/2015 |
| JP | 2016028275 | 2/2016 |
| JP | 2016033867 | 3/2016 |
| JP | 2018189906 | 11/2018 |
| TW | 201809798 | 3/2018 |
| WO | 1998/058291 | 12/1998 |
| WO | 0063738 | 10/2000 |
| WO | 2005024485 | 3/2005 |
| WO | 2005024491 | 3/2005 |
| WO | 2005093493 | 10/2005 |
| WO | 2009074638 | 6/2009 |
| WO | 2011130720 | 10/2011 |
| WO | 2013188464 | 12/2013 |
| WO | 2015081313 | 6/2015 |
| WO | 2015158828 | 10/2015 |
| WO | 2016103251 | 6/2016 |
| WO | 2016132347 | 8/2016 |
| WO | 2017106873 | 6/2017 |
| WO | 2017199232 | 11/2017 |
| WO | 2018/013307 | 1/2018 |
| WO | 2021124315 | 6/2021 |
| WO | 2021260708 | 2/2022 |

OTHER PUBLICATIONS

M. Kivanc Hedili et al "Light-efficient augmented reality display with steerable eyebox", Optics Express vol. 27, Issue 9, pp. 12572-12581 (2019) •https://doi.org/10.1364/OE.27.012572.

Jinying Li et al "Improvement of pointing accuracy for Risley prisms by parameter identification", Sep. 2017Applied Optics 56(26):7358; DOI:10.1364/AO.56.007358.

Klaus Ehrmann et al "Optical power mapping using paraxial laser scanning", Proceedings vol. 7163, Ophthalmic Technologies XIX; 71631E (2009) https://doi.org/10.1117/12.806765 Event: SPIE BiOS, 2009, San Jose, California, United States.

Erhui Qi et al "The Application of Pentaprism Scanning Technology on the Manufacturing of M3MP", Proc. of SPIE vol. 9682 96821A-1 Downloaded From: http://proceedings.spiedigitallibrary.org/ on Dec. 8, 2016 Terms of Use: http://spiedigitallibrary.org/ss/termsofuse.aspx.

Wei Chen et al"An Image Quality Evaluation Method of near-eye display" , First published: May 25, 2016 https://doi.org/10.1002/sdtp. 10935.

Amotchkina T. et al; "Stress compensation with antireflection coatings for ultrafast laser applications: from theory to practice," Opt. Express 22, 30387-30393 (2014) Amotchkina T. et al. Dec. 31, 2014 (Dec. 31, 2014).

Mori H. et al., "Reflective coatings for the future x-ray mirror substrates", Proc. SPIE 10699, Space Telescopes and Instrumentation 2018: Ultraviolet to Gamma Ray, 1069941 (Jul. 6, 2018); available at URL <http://doi.org/10.1117/12.2313469> Mori H. et al. Jul. 6, 2018 (Jul. 6, 2018).

Chalifoux B.D. et al., "Compensating film stress in thin silicon substrates using ion implantation," Opt. Express 27, 11182-11195 (Jan. 21, 2019) Chalifoux B.D. et al. Jan. 21, 2019 (Jan. 21, 2019).

* cited by examiner

ROTATABLE LIGHTPIPE

FIELD OF THE INVENTION

The present invention generally relates to lightpipes, and in particular, it concerns a lightpipe that can be deployed, without redesign, relative to associated system components.

BACKGROUND OF THE INVENTION

Pantoscopic tilt is defined as a lens tilt about the horizontal axis, with respect to primary gaze of a subject. In a simple way, pantoscopic tilt can be explained as "the rotation of lens bottom towards the cheeks". Typically, these tilts range from 0-12 degrees, and tilt between 3-7 degrees are considered normal. Pantoscopic tilt usually depends on how a pair of glasses sits on the user's (wearer's) face.

The amount of pantoscopic tilt varies depending on use and user. Lenses can be used to display images for applications such as augmented reality (AR) and virtual reality (VR). In these cases, components are needed to supply an image for display by a lens. The components can include power supply, image source, light source, optical manipulation and projection. One component that can be used is a lightpipe. The lightpipe is typically used for combining multiple wavelengths of light (for example from an RGB LED light source) and/or homogenizing light uniformity across an exit aperture of the lightpipe for input to optical waveguide device or system.

For aesthetic reasons, it is desirable to have the lightpipe aligned with the frame of the glasses. However, varying components of the system and varying orientation of the components, such as the lens, and the pantoscopic tilt, varies the relative configuration (geometrical relationship) of the associated components, including the orientation of a conventional lightpipe. A conventional solution is to redesign the lightpipe so the lightpipe can be aligned with the frame of the glasses.

SUMMARY

Based on a rotational axis of symmetry for an output of a lightpipe coinciding with an input axis for projection optics, the lightpipe can be rotated around the rotational axis, in order to align the lightpipe with a frame of associated glasses, or correspondingly the temple of a wearer of the glasses. Thus, an improved or optimal aesthetic look of a display system can be approached. The lightpipe of the display system can be aligned with the frame of the glasses, or even hidden within the frame, depending on implementation details and requirements for image projection components. If a pantoscopic tilt of the lens (waveguide) changes, a rotation of the lightpipe can be applied to the lightpipe to bring the lightpipe in a position aligned with the temple again, thus avoiding the need for a lightpipe redesign.

According to the teachings of the present embodiment there is provided an apparatus including: projecting optics (24) including a spatial light modulator (SLM) (8), the projecting optics having a projecting optics input surface (24N) having an x-axis and y-axis corresponding to an input surface of the spatial light modulator (8), and a lightpipe (2) having a lightpipe axis (30) along a long axis of the lightpipe from a lightpipe input surface (2N) to a lightpipe output surface (2T), and having an output z-axis (10) perpendicular to the lightpipe output surface and the projecting optics input surface (24N), the lightpipe (2) deployed with the lightpipe axis (30) at an oblique angle relative to the x-axis, the y-axis, and the z-axis. In a preferred embodiment, the lightpipe axis (30) is nonparallel to the output axis (10).

In an optional embodiment, further including an anisotropic diffuser (3) configured to accept output light (28T) from the lightpipe output surface (2T) and provide diffused light (28D) toward the projecting optics input surface (24N), the diffuser (3) disposed parallel to the lightpipe output surface (2T) and rotated non-parallel to both the x-axis and the y-axis of the projecting optics input surface (24N).

In another optional embodiment, the anisotropic diffuser (3) has a non-symmetric function scattering light into a wider range of angles in a first direction relative to scattering light into a smaller range of angles in a second direction.

In another optional embodiment, the diffuser (3) is deployed in contact with the lightpipe output surface (2T).

In another optional embodiment, the lightpipe 2 and the diffuser (3) are configured in an illuminating system (26), the illuminating system (26) further including a light source (1) providing input light (28N) via a first Fresnel lens (22A) to a lightpipe input surface (2N).

In another optional embodiment, the illuminating system (26) further includes a second Fresnel lens (22B) and a polarizer (4) via which the diffused light (28D) is provided toward an illuminating system output surface (26T).

In another optional embodiment, the lightpipe (2) is configured in an illuminating system (26), the illuminating system rotatably connected to the projecting optics (24).

In another optional embodiment, the illuminating system (26) further includes an anisotropic diffuser (3) operationally connected to the lightpipe (2) such that the lightpipe (2) and the diffuser (3) rotate synchronously relative to the rotational axis (10). In another optional embodiment, the illuminating system (26) further includes an anisotropic diffuser (3) such that the lightpipe (2) and the diffuser (3) rotate independently relative to the rotational axis (10).

In another optional embodiment, the lightpipe axis (30) is nonparallel to the output axis (10).

According to the teachings of the present embodiment there is provided a method of deploying the apparatus wherein the lightpipe (2) is substantially aligned with a frame axis (110) of a frame (11) of a user's glasses, the frame axis (110) being a longitudinal axis along a frame (11), the frame (11) being between a lens of the glasses and the user's ear.

An apparatus including a lightpipe (2) having a lightpipe axis (30) along a long axis of the lightpipe from a lightpipe input surface (2N) to a lightpipe output surface (2T), and having a rotational axis (10) perpendicular to the lightpipe output surface and projecting optics (24), the lightpipe (2) deployed with the lightpipe axis (30) substantially aligned with a lateral surface (14L) of a geometrical construction of a right circular cone (14) having a vertex (14V) coinciding with the rotational axis (10), the cone having a cone axis aligned with the rotational axis (10), and the vertex (14V) substantially aligned with the lightpipe output surface (2T).

A method of deploying the apparatus of claim 1 wherein a first angle between the rotational axis (10) and a frame axis (110) is substantially equal to a second angle between the rotational axis (10) and the lightpipe axis (30), the frame axis (110) being a longitudinal axis along a frame (11), such that rotating the lightpipe (2) around the rotational axis (10) minimizes a spacing angle (38A) between the lightpipe axis (30) and the frame axis (110), thus aligning substantially parallel the lightpipe (2) with the frame (11).

BRIEF DESCRIPTION OF FIGURES

The embodiment is herein described, by way of example only, with reference to the accompanying drawings, wherein.

DETAILED DESCRIPTION—FIGS. 1A TO 5B

The principles and operation of the apparatus according to a present embodiment may be better understood with reference to the drawings and the accompanying description. A present invention is an apparatus for rotatably configuring a lightpipe. The apparatus facilitates configuration of a lightpipe with respect to a variety of configurations of associated components, without redesign of the lightpipe.

Based on an axis of symmetry for an output of the lightpipe (rotational axis, output axis), coinciding with an input axis for projection optics, the lightpipe can be rotated on (around) the axis, in order to align the lightpipe with a frame of associated glasses, or correspondingly the temple of a user (wearer of the glasses). Thus, an improved or optimal aesthetic look of the display system can be approached. The lightpipe can be aligned with the frame of the glasses, or even hidden within the frame, depending on implementation details and requirements for image projection components. If a pantoscopic tilt of the lens (waveguide) changes, a rotation of the lightpipe can be applied to the lightpipe to bring the lightpipe in a position aligned with the temple again, thus avoiding the need for a lightpipe redesign.

The lightpipe has an output axis referred to in the context of this description as a "rotational axis", and the light output from the lightpipe is rotationally symmetrical about this rotational axis. The lightpipe is configured for deployment with a longitudinal axis of the lightpipe at a constant inclination relative to the rotational axis. An extension of the lightpipe axis is not required to be aligned with a PBS (polarized beam splitter, reflecting polarizer) of the projecting optics.

Figure 1A:
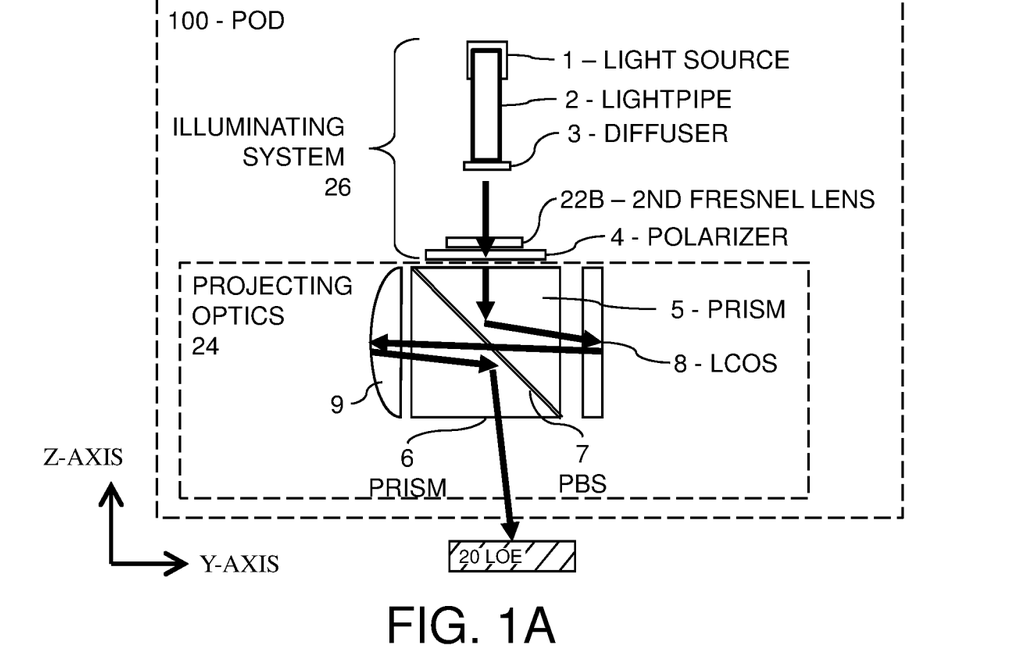
FIG. 1A, a first view of a design of a micro-display projector.
Figure 1B:
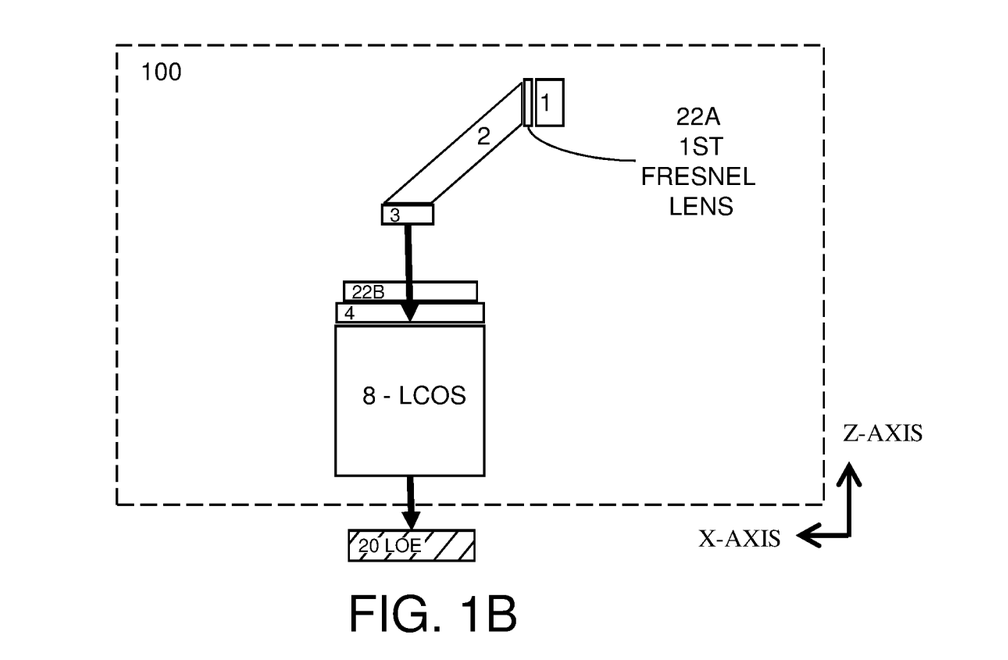
FIG. 1B, a second view of a design of a micro-display projector.

Referring to FIG. 1A, there is shown a first view of a design of a micro-display projector and FIG. 1B, there is shown a second view of a design of a micro-display projector. Elements are not drawn to scale. For simplicity and clarity, typical exemplary components are used in this description. One skilled in the art will realize that other components and configurations can be used. For example, alternate light sources, additional, removal, or alternative lenses in various stages of light propagation, alternative image generation technologies, etc.

An exemplary micro-display projector (POD 100) includes an exemplary illumination system 26 and exemplary projecting optics 24. The exemplary illumination system 26 includes a light source 1, a first Fresnel lens 22A, a lightpipe 2, a diffuser 3, and a second Fresnel lens 22B attached to a polarizer 4. The exemplary projecting optics 24 includes a first prism 5, a polarized beam splitter (PBS) 7, spatial light modulator (for example, a spatial light module, an LCOS) 8, a second prism 6, and a collimator 9. The output of the POD 100 is sent for display, such as to a waveguide, for example a lightguide optical element (LOE) 20.

The light source 1 can be an RGB LED module, for example having three spatially separated LEDs, one each of red, green, and blue. The distinct colors of light generated and output from the light source 1 are typically focused using a first Fresnel lens 22A to concentrate the light for more efficient input (injection) into the lightpipe 2. The input colors are combined (mixed, homogenized) during light propagation in the lightpipe 2 to produce light at an exit aperture of the lightpipe 2, assisted by the diffuser 3 to provide uniform white light irradiance output as input to the projecting optics 24. Typically, the second Fresnel lens 22B is spaced from the diffuser 3.

The illumination system 26 of the current implementation typically outputs polarized light from the polarizer 4. The illuminating system 26 has an illuminating system output surface 26T providing light out from the illuminating system 26 to a projecting optics input surface 24N of the projecting optics 24. The polarized light is received by the exemplary projecting optics 24, propagates via the first prism 5 and is reflected from a first side of a PBS 7 toward a spatial light modulator (SLM), such as exemplary LCOS 8. The LCOS 8 is a non-limiting example of a technology to use the light from the illumination system to generate an image. After reflecting back from the LCOS, the polarization of the image light is rotated by 90 degrees, so the image light propagates through the first prism 5 and passes though the PBS 7 and second prism 6 to the collimator 9. One example of a collimator 9 implementation is using a collimating mirror (such as a spherical mirror or a lens combined with a spherical mirror) integrated with a quarter-waveplate. The collimated image light has a polarization rotated 90 degrees after reflection from the collimator 9, so propagates via second prism 6, and is reflected by the PBS 7. The collimated image light is then output from the POD 100. The output image light is sent to a display, such as to a waveguide, in this case a lightguide optical element (LOE) 20.

The projecting optics input surface 24N has an x-axis and y-axis corresponding to an input surface of the LCOS 8. The two surfaces of the projecting optics input surface 24N and the input surface of the LCOS 8 may be parallel or use a reflected light path to be at a relative angle to each other. The orientation of the two surfaces correspond, being optically equivalent to a straight path from the projecting optics input surface 24N and the input surface of the LCOS 8. In a case where the light path is reflected in the projecting optics 24, and the two surfaces are at a relative angle, the axis will be correspondingly reflected.

Figure 2A:
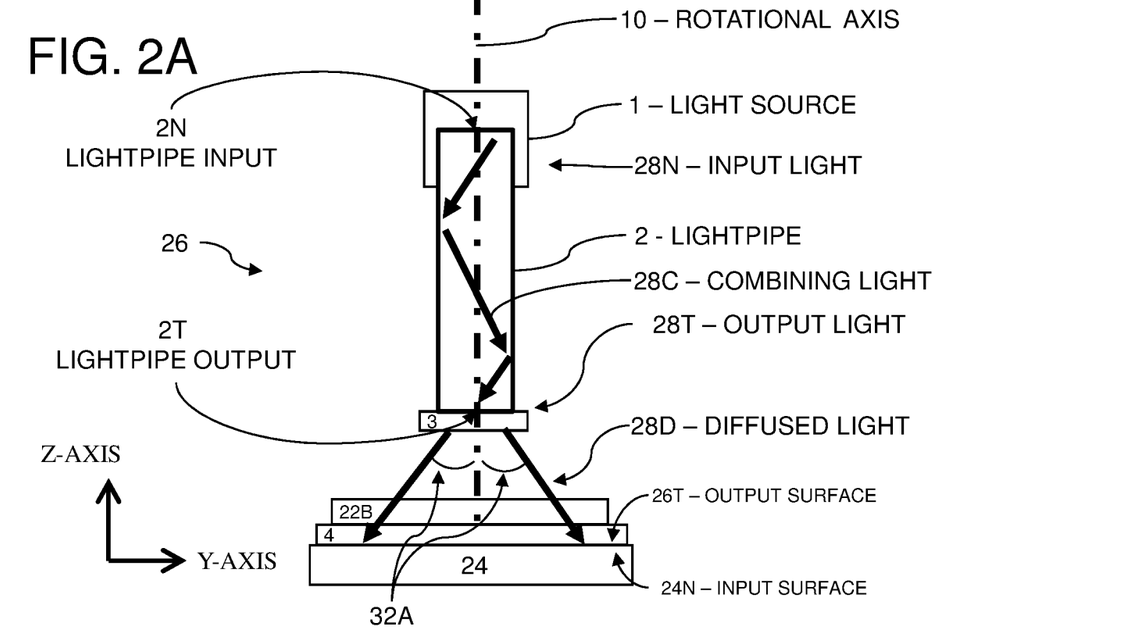
FIG. 2A, and FIG. 2B, a first view and a second view of details of propagation of light in the lightpipe, corresponding to respective FIG. 1A first view and FIG. 1B second view.
Figure 2B:
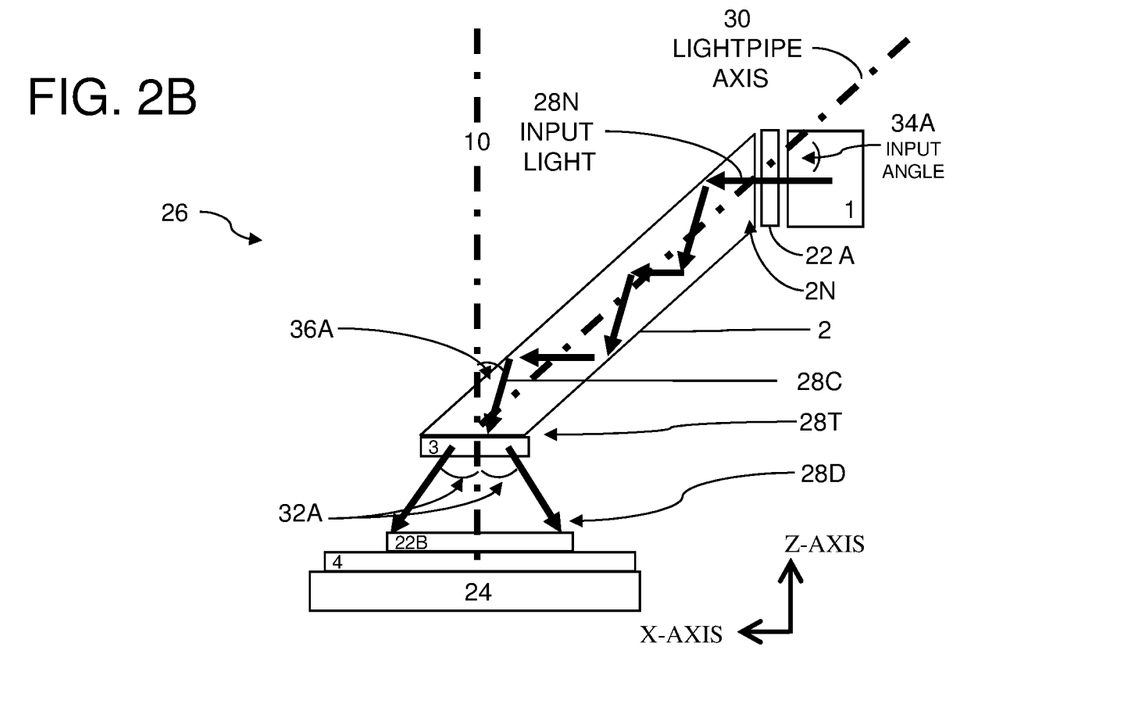

Referring to FIG. 2A, and FIG. 2B, there are shown a first view and a second view of details of propagation of light in the lightpipe, corresponding to respective FIG. 1A first view and FIG. 1B second view. The propagation of light 28C being combined in the lightpipe 2 is typically by total internal reflection (TIR). A rotational axis 10 of the lightpipe 2 is shown perpendicular to the input of the projecting optics 24. The rotational axis 10 is also referred to in the context of this document as the "output axis" and in the figures as the "z-axis". While this output axis is referred to as a "rotational" axis, this description is not limiting, and implementations include lightpipes 2 and illuminating systems 26 both that rotate and are stationary with respect to the projecting optics 24. A lightpipe axis 30 is shown along a long axis of the lightpipe 2, in a direction propagation of the combining light 28C along the lightpipe 2, typically along a length of the lightpipe 2, from lightpipe input 2N to lightpipe output 2T.

The light generated from the light source 1 enters the lightpipe 2 at the lightpipe input 2N in a cone defined by the input angular aperture of the lightpipe 2. In FIG. 2B, the light from the light source 1 is represented by a single ray of input light 28N entering the lightpipe 2 at an input angle 34A relative to the lightpipe axis 30. The input angle 34A is also referred to in the context of this description as a "first angle", or simply "input angle". Correspondingly, after the light 28C propagates and combines through the lightpipe 2, the combined light 28C exits the lightpipe 2 as output light 28T. The output light 28T exits the lightpipe 2 at an angle shown as output light angle 36A. The output light 2T is scattered (diffused) by the diffuser 3 inside a cone defined by a lightpipe output angle 32A (maximum scatter angle, second angle, output angle) relative to the rotational axis 10, providing diffused light 28D. Using a combination of the diffuser 3, the design of the light source 1, and the first Fresnel lens 22A, the radiance of the diffused light 28D exiting the diffuser 3 is substantially rotationally symmetric relative to the rotational axis 10.

A feature of the current embodiment is the innovative insight and realization that the lightpipe 2 can be designed and configured so the output light 28T, and thus the diffused light 28D are approximately rotationally symmetric relative to the rotational axis 10. This feature allows the lightpipe 2 to be tilted relative to the projecting optics 24 (the lightpipe axis 30 is non-parallel to the rotational axis 10). As the lightpipe light output 28T in terms of angular (output angle 32A) and spatial distribution is substantially symmetrical relative to the rotational axis 10, the rotation of the lightpipe 2 around the rotational axis 10 does not impact optical performance of the POD 100.

Another feature of the current embodiment is the preferred implementation of the diffuser 3 as an anisotropic diffuser having a non-symmetric function scattering light into a wider range of angles in a first direction relative to scattering light into a smaller range of angles in a second direction. Optionally, and preferably in addition, the anisotropic diffuser 3 is (input and output surfaces are) parallel and aligned with the lightpipe output surface 2T. Thus, the oblique orientation of the lightpipe 2 corresponds to the diffuser being rotated non-parallel (not aligned) with the projecting optics input surface 24N. That is, the first direction and second direction of the diffuser 3 are rotated, non-parallel, to the x-axis and y-axis of the projecting optics input surface 24N.

Note that for simplicity in the figures, only one light ray is generally depicted. The light can also be referred to as a "light" or "beam". One skilled in the art will realize that the depicted light (ray) is a sample beam of the actual light, which typically is formed by multiple beams, at slightly differing angles. Except where specifically referred to as an extremity (edge) of the light, the rays illustrated are typically a centroid of the light. In a case where the light corresponds to an image and the central ray is a center ray from a center of the image or a central pixel of the image.

Figure 3A:
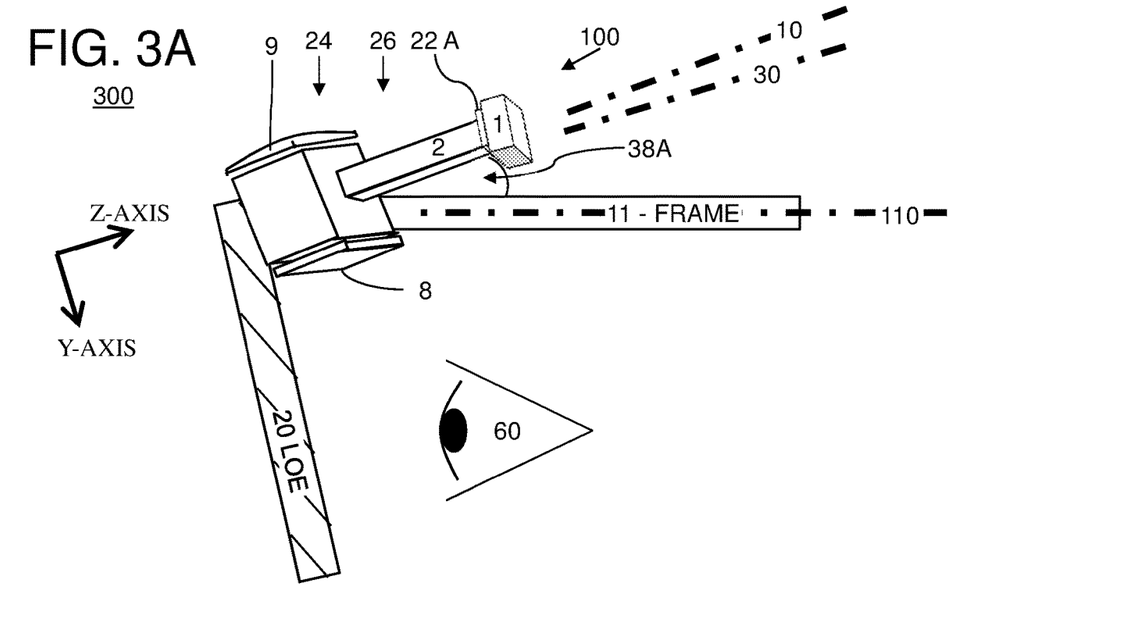
FIG. 3A, a display system with the lightpipe 2 not aligned with the frame in the vertical plane.

Referring to FIG. 3A, there is shown a view of a display system 300 including the POD 100 integrated with the waveguide (LOE) 20 and in relation to a frame 11 (for example, showing a portion of glasses worn by the user). In the current figure, the lightpipe 2 not aligned with the frame 11 in the vertical plane, relative to the eye 60 of the user. Note that the diffuser 3, the second Fresnel lens 22B, and the polarizer 4 are not shown in the current figure. In this case, the LOE 20 functions as the lens of the glasses. For example, because of the pantoscopic tilt of the waveguide (LOE 20), the illumination system 26 is tilted into the page, hence lightpipe axis 30 is into the page, relative to the projecting optics 24. The lightpipe axis 30 is not coincident with the rotational axis 10. The tilt of the POD 100 relative to the waveguide results in the lightpipe 2 not aligned with the temple of the glass's frame 11. A spacing angle 38A is between the lightpipe 2 and the frame 11 (between the lightpipe axis 30 and a longitudinal axis of the frame 110 along the length of the frame 11). Ideally, there should not be an angle 38A between the lightpipe 2 and the frame 11, that is, the spacing angle 38A should approach and be substantially zero. Where the spacing angle 38A is larger than a given amount, the lightpipe 2 is not aligned with the frame 11, and the resulting aesthetic look of the integration of the display system 300 and glasses is less than the aesthetic look where the lightpipe 2 is aligned with the frame 11.

Figure 3B:
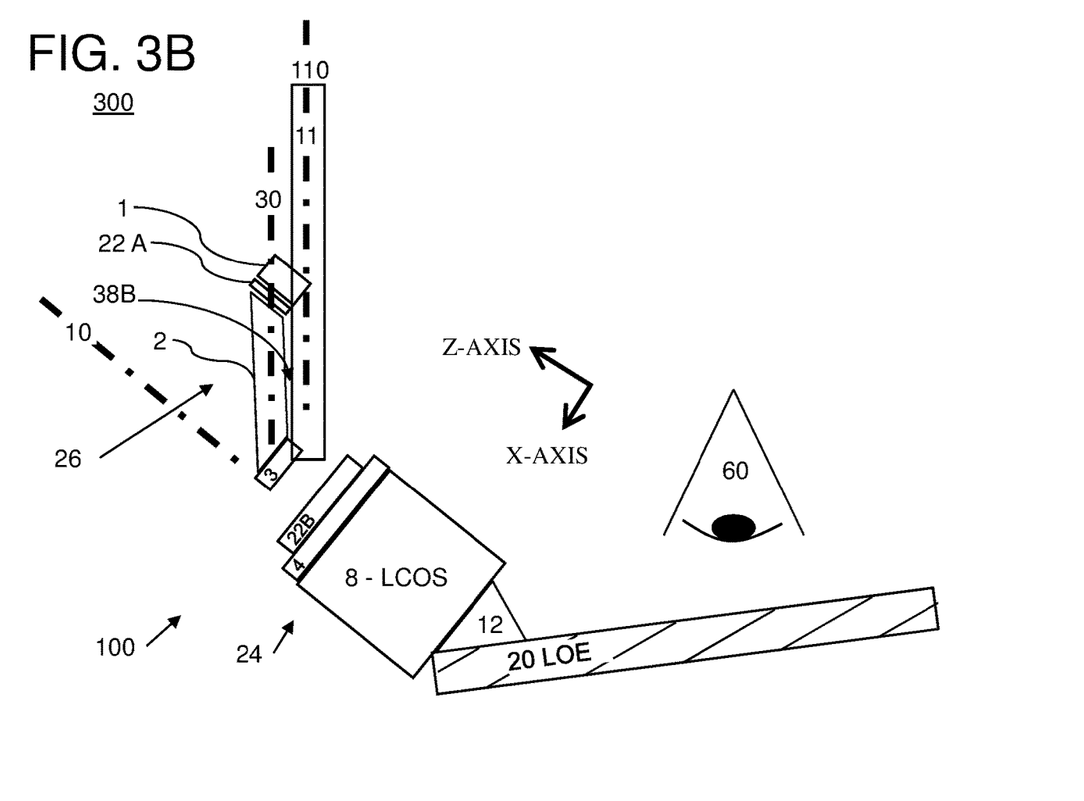
FIG. 3B, a display system with the lightpipe 2 properly aligned with the frame in the horizontal plane.

Referring to FIG. 3B, there is shown a view of a display system 300 including the POD 100 integrated with the LOE 20 and in relation to a frame 11 (for example, showing a portion of glasses worn by the user). In the current figure, the lightpipe 2 is properly aligned with the frame 11, in the horizontal plane relative to the eye 60 of the user. Note, the current figure is simplified, as the POD 100 is actually tilted (rotated) relative to the waveguide (LOE) 20. The spacing angle 38B is substantially zero, having the lightpipe axis 30 aligned in parallel with the longitudinal axis of the frame 110 in the horizontal plane.

Figure 4A:
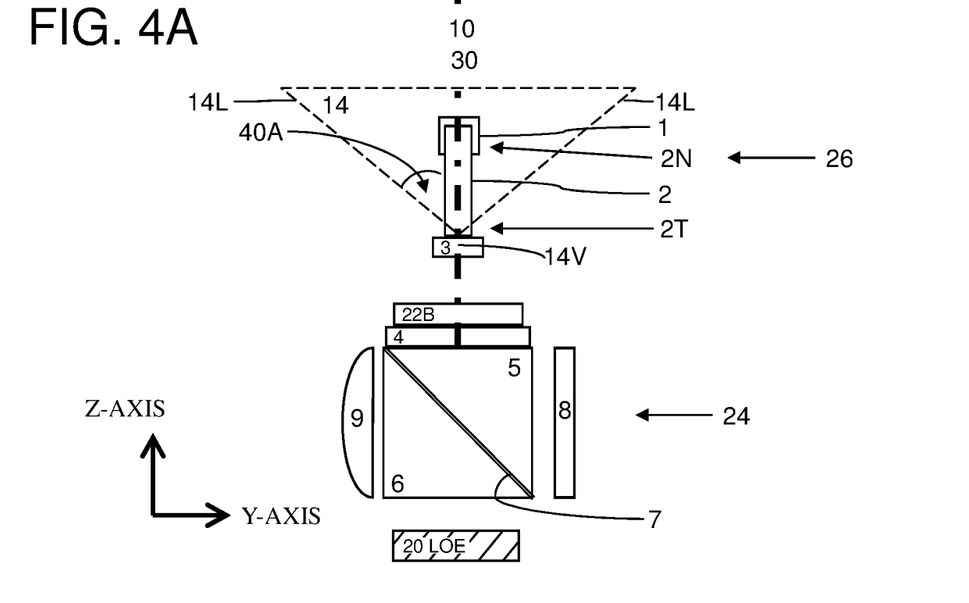
FIG. 4A, and FIG. 4B, there are shown a first view and a second view of a cone, the lateral surface on which the lightpipe rotates, corresponding to respective FIG. 1A first view and FIG. 1B second view.
Figure 4B:
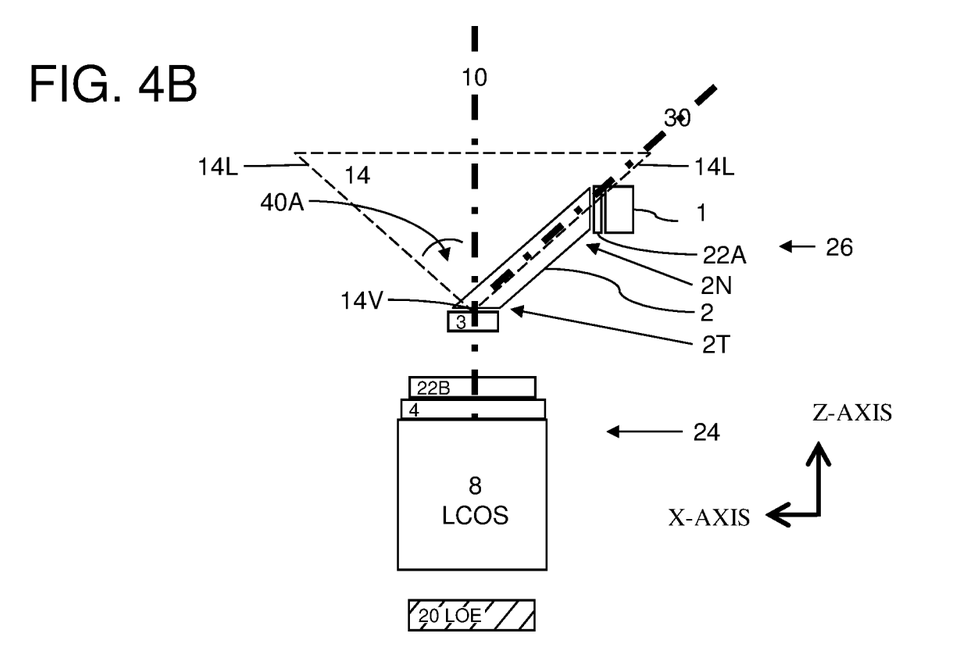

Referring to FIG. 4A, and FIG. 4B, there are shown a first view and a second view of a cone, the lateral surface on which the lightpipe rotates, corresponding to respective FIG. 1A first view and FIG. 1B second view. A geometrical construction of a right circular cone 14 has a vertex 14V coinciding with the rotational axis 10, and the surface of the lightpipe output 2T. The vertex 14V also coincides with the intersection of the lightpipe axis 30. Typically, the surface of the lightpipe output 2T is parallel to the plane of the surface of the diffuser 3, substantially in contact with the diffuser 3, so the vertex 14V also coincides with the intersection of the rotational axis 10 and the diffuser 3. The vertex 14V of the cone 14 typically lies on the surface of the diffuser 3 in a direction of the output light 28T first impinging on the diffuser. The axis of the cone 14 substantially coincides with the rotational axis 10. The cone 14 has a lateral surface 14L. A half-aperture angle 40A is shown in the current figure between the lateral surface 14L and the axis of the cone. The lightpipe axis 30 is substantially aligned with the lateral surface 14L. The vertex 14V of the cone 14 is aligned at the surface of the lightpipe output 2T. The surface of the cone (lateral surface 14L) is formed by sweeping the lightpipe axis 30 around the rotational axis 10. The lateral surface 14L describes possible positions for configuring the lightpipe 2, while maintaining operation of the POD 100, in particular maintaining the radiance of the light (output light 28T, hence diffused light 28D) symmetric relative to the rotational axis 10. One skilled in the art will realize that based on the current description, the lightpipe 2 can be shifted, for example along (in the direction of) the rotational axis 10 (z-axis direction). Note, in FIG. 4B, the lightpipe axis 30 and cone surface 14L are slightly offset for viewing in the figures, as actually the lightpipe axis 30 and cone surface 14L substantially coincide.

For reference, a "vertex" is also referred to in the field of mathematics as an "apex". The axis of a cone is the straight line (if any), passing through the vertex, about which the base (and the whole cone) has a circular symmetry. The perimeter of the base of a cone is called the "directrix", and each of the line segments between the directrix and vertex is a "generatrix" or "generating line" of the lateral surface of the cone. The "base radius" of a circular cone is the radius of the circular cone's base; often this is simply called the radius of the cone. The aperture of a right circular cone is the maximum angle between two generatrix lines. For example, if the generatrix makes an angle θ to the axis, the aperture is 2θ.

A feature of the current embodiment is that the lightpipe 2 can be rotated around the rotational axis 10, while maintaining the vertex 14V at the surface of the lightpipe output 2T and the uniform white light irradiance output of the lightpipe 2 does not depend on (is independent of) this rotation of the lightpipe 2. In other words, the lightpipe 2 can be rotated around the rotational axis 10, while maintaining the lightpipe axis 30 on the lateral surface 14L of the cone 14, and the lightpipe will provide uniform white light irradiance output, which does not depend on the rotation of the lightpipe 2.

By rotating the lightpipe 2 around the rotational axis 10, an orientation of the lightpipe 2 (a position of the lightpipe 2 on the lateral surface 14L of the cone 14) can be found that is at a desirable angle (rotation) (desirable spacing angles 38A and 38B) to the glass's frame 11, and hence the temple of the user (wearer of the glasses), while maintaining operation of the lightpipe 2, illumination system 26, and the POD 100. In a general case, the glass's frame 11 does not lie on the lateral surface 14L. Hence, there may not be a lightpipe rotation around the rotational axis 10 which can make both spacing angles 38A and 38B equal to zero. For example, in FIG. 3A the spacing angle 38A is unacceptably large, while in FIG. 3B the spacing angle 38B is almost zero. An objective of the lightpipe rotation is to find an optimal position of the lightpipe 2 on the lateral surface 14L of the cone 14 that minimizes both spacing angles 38A and 38B, and makes the display system 300 look acceptably well, aesthetically.

The lightpipe 2 can be rotated around an axis, which is an axis of symmetry of the lightpipe light output 2T, in order to align the lightpipe 2 with the temple of the glass frame 11 to achieve a desirable aesthetic look of the display system 300. If a pantoscopic tilt of the waveguide (LOE 20) changes, a rotation of the lightpipe 2 can be applied to bring the lightpipe 2 in a position aligned with the temple again, thus avoiding the need for redesign of the lightpipe 2.

Figure 5A:
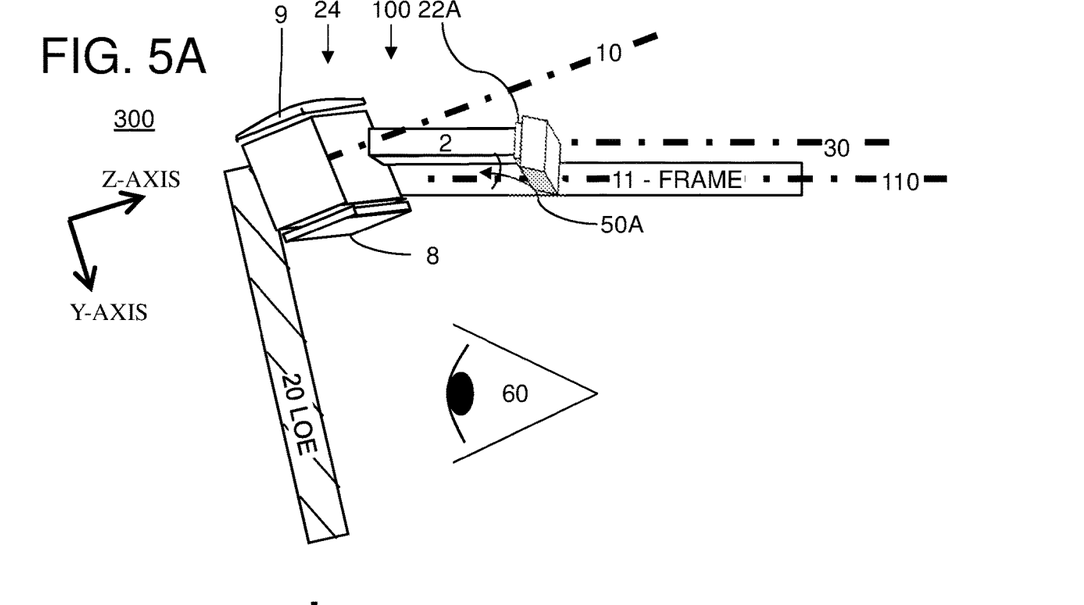
FIG. 5A and FIG. 5B there is shown in each figure a view of the POD integrated with the LOE and the lightpipe rotated (with the same rotation) in relation to the frame.
Figure 5B:
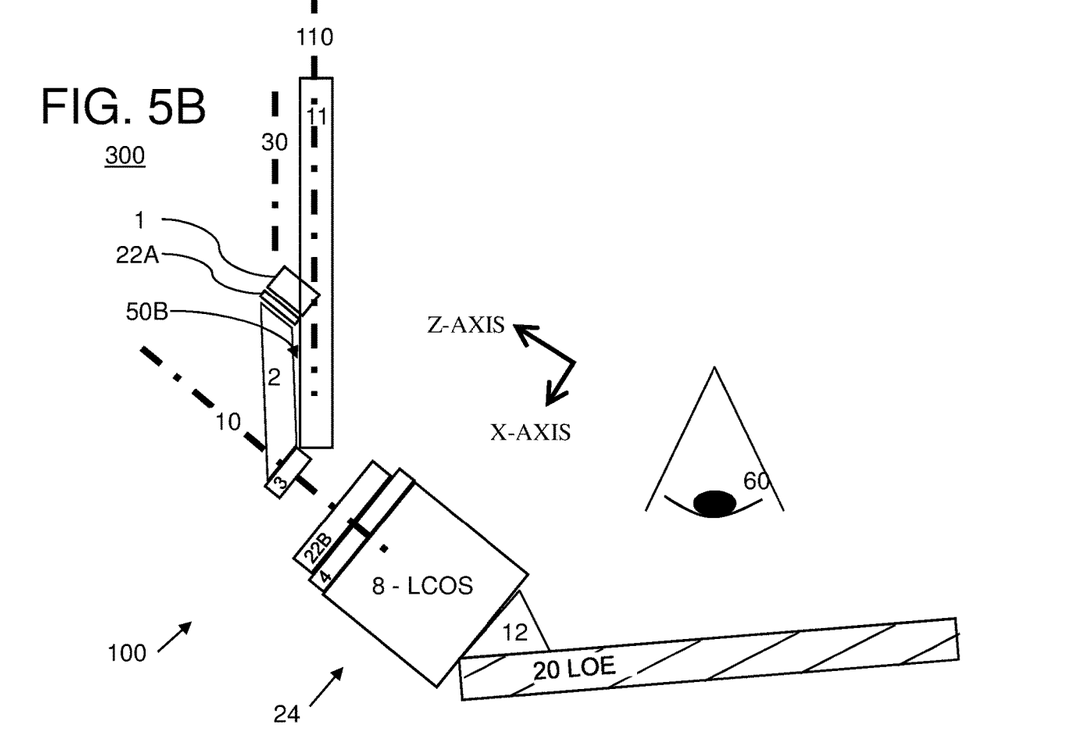

Referring to FIG. 5A and FIG. 5B there is shown in each figure a view of the POD 100 integrated with the LOE 20 and the lightpipe 2 rotated (with the same rotation) in relation to the frame 11. The lightpipe 2 is rotated in such a way that the lightpipe 2 is aligned with the frame 11 acceptably well. Note that in the current FIG. 5A the diffuser 3, the second Fresnel lens 22B, and the polarizer 4 are not shown. Note, the current FIG. 5B is simplified, as the POD 100 is actually tilted (rotated) relative to the waveguide (LOE) 20. In the current figures, the lightpipe 2 is rotated nearly, but not exactly parallel to the frame 11. This can be seen by non-zero angle 50B in the horizontal plane between the lightpipe 2 and the frame 11 (between the lightpipe axis 30 and the axis of the frame 110). Note that in another plane, such as mostly vertical, the angle 50A may be substantially zero. Angles 50A and 50B are defined similar to the above-described angles 38A and 38B. Although not perfectly aligned, a deviation from optimal (substantially parallel) such as non-zero angle 50B may be acceptable within given aesthetic constraints of the glass frame.

Alternatively, a non-zero angle 50B may be desirable to orient the lightpipe 2 and/or the illuminating system 26 and the POD 100. At a desired angle away from the frame 11 of the glasses and/or user to achieve an artistic, design, or aesthetic effect.

While the current description uses the lightpipe 2 as a portion of the exemplary illumination system 26 to provide uniform white light, this description is not limiting. It is foreseen that based on the current description the lightpipe can be deployed in other configurations. One non-limiting example is deploying the lightpipe 2 with an imaging optical element (in place of the light source 1). In this case, the lightpipe 2 carries image information from an image projector near the user's temple, for example in the frame 11 of glasses, to a coupling-in element into the LOE 20. Using the lightpipe 2, image orientation where an image is injected into the LOE 20 will not depend on the rotation of the lightpipe 2 around the rotational axis 10. A compensation can be used, for example, the image projector that is the source of the image could be rotated with and/or independently from the lightpipe 2.

Note that the above-described examples, numbers used, and exemplary calculations are to assist in the description of this embodiment. Inadvertent typographical errors, mathematical errors, and/or the use of simplified calculations do not detract from the utility and basic advantages of the invention.

To the extent that the appended claims have been drafted without multiple dependencies, this has been done only to accommodate formal requirements in jurisdictions that do not allow such multiple dependencies. Note that all possible combinations of features that would be implied by rendering the claims multiply dependent are explicitly envisaged and should be considered part of the invention.

It will be appreciated that the above descriptions are intended only to serve as examples, and that many other embodiments are possible within the scope of the present invention as defined in the appended claims.

What is claimed is:

1. An apparatus comprising:
   (a) projecting optics (24) including a spatial light modulator (SLM) (8), the projecting optics having a projecting optics input surface (24N) having an x-axis and y-axis corresponding to an input surface of said spatial light modulator (8); (b) a lightpipe (2) having a lightpipe axis (30) along a long axis of the lightpipe from a lightpipe input surface (2N) to a lightpipe output surface (2T), and having an output z-axis (10) perpendicular to said lightpipe output surface and said projecting optics input surface (24N), said lightpipe (2) deployed with said lightpipe axis (30) at an oblique angle relative to said x-axis, said y-axis, and said z-axis; and
   (c) an anisotropic diffuser (3) configured to accept output light (28T) from said lightpipe output surface (2T) and provide diffused light (28D) toward said projecting optics input surface (24N), said diffuser (3) disposed parallel to said lightpipe output surface (2T) and rotated non-parallel to both said x-axis and said y-axis of said projecting optics input surface (24N).

2. The apparatus of claim 1 wherein said anisotropic diffuser (3) has a non-symmetric function scattering light into a wider range of angles in a first direction relative to scattering light into a smaller range of angles in a second direction.

3. The apparatus of claim 1 wherein said diffuser (3) is deployed in contact with said lightpipe output surface (2T).

4. The apparatus of claim 1 wherein said lightpipe (2) and said diffuser (3) are configured in an illuminating system (26), said illuminating system (26) further including a light source (1) providing input light (28N) via a first Fresnel lens (22A) to a lightpipe input surface (2N).

5. The apparatus of claim 4 wherein said illuminating system (26) further includes a second Fresnel lens (22B) and a polarizer (4) via which said diffused light (28D) is provided toward an illuminating system output surface (26T).

6. The apparatus of claim 1 wherein said lightpipe (2) is configured in an illuminating system (26), said illuminating system rotatably connected to said projecting optics (24).

7. The apparatus of claim 1 wherein said lightpipe axis (30) is nonparallel to said output axis (10).

8. A method of deploying the apparatus of claim 1 wherein said lightpipe (2) is substantially aligned with a frame axis (110) of a frame (11) of a user's glasses, said frame axis (110) being a longitudinal axis along a frame (11), said frame (11) being between a lens of the glasses and the user's ear.

9. An apparatus comprising:
(a) projecting optics (24) including a spatial light modulator (SLM) (8), the projecting optics having a projecting optics input surface (24N) having an x-axis and y-axis corresponding to an input surface of said spatial light modulator (8); and
(b) a lightpipe (2) having a lightpipe axis (30) along a long axis of the lightpipe from a lightpipe input surface (2N) to a lightpipe output surface (2T), and having an output z-axis (10) perpendicular to said lightpipe output surface and said projecting optics input surface (24N), said lightpipe (2) deployed with said lightpipe axis (30) at an oblique angle relative to said x-axis, said y-axis, and said z-axis, wherein said lightpipe (2) is configured in an illuminating system (26), said illuminating system rotatably connected to said projecting optics (24), wherein said illuminating system (26) further includes an anisotropic diffuser (3) operationally connected to said lightpipe (2) such that said lightpipe (2) and said diffuser (3) rotate synchronously relative to said rotational axis (10).

10. An apparatus comprising:
(a) projecting optics (24) including a spatial light modulator (SLM) (8), the projecting optics having a projecting optics input surface (24N) having an x-axis and y-axis corresponding to an input surface of said spatial light modulator (8); and
(b) a lightpipe (2) having a lightpipe axis (30) along a long axis of the lightpipe from a lightpipe input surface (2N) to a lightpipe output surface (2T), and having an output z-axis (10) perpendicular to said lightpipe output surface and said projecting optics input surface (24N), said lightpipe (2) deployed with said lightpipe axis (30) at an oblique angle relative to said x-axis, said y-axis, and said z-axis, wherein said lightpipe (2) is configured in an illuminating system (26), said illuminating system rotatably connected to said projecting optics (24), wherein said illuminating system (26) further includes an anisotropic diffuser (3) such that said lightpipe (2) and said diffuser (3) rotate independently relative to said rotational axis (10).

* * * * *